United States Patent
Tidland (10) Patent No.: US 6,214,397 B1
(45) Date of Patent: Apr. 10, 2001

(54) HOME USE COFFEE BEAN ROASTING DEVICE AND METHOD OF ROASTING

(76) Inventor: John W. Tidland, 3408 NE. Corbin Rd., Vancouver, WA (US) 98686

( * ) Notice: Subject to any disclaimer, the term of this patent is extended or adjusted under 35 U.S.C. 154(b) by 0 days.

(21) Appl. No.: 09/653,825

(22) Filed: Sep. 1, 2000

Related U.S. Application Data (63) Continuation of application No. 09/264,368, filed on Mar. 8, 1999, now Pat. No. 6,123,971.

(51) Int. Cl.$^7$ .................................................. A23N 12/10
(52) U.S. Cl. ...................... 426/466; 426/467; 426/469; 99/286; 99/323.4; 99/348
(58) Field of Search .................................. 426/465, 466, 426/467, 469; 99/286, 323.4, 323.5, 348

(56) References Cited

U.S. PATENT DOCUMENTS

| | | | |
|---|---|---|---|
| 2,325,648 | * | 8/1943 | Kayden .................................. 99/286 |
| 2,565,967 | * | 8/1951 | Jones .................................. 99/323.4 |
| 2,639,133 | * | 5/1953 | Clary .............................. 426/466 X |
| 3,964,175 | * | 6/1976 | Sivetz .................................... 99/286 |
| 4,860,461 | * | 8/1989 | Tamaki et al. ...................... 99/286 X |
| 4,871,901 | * | 10/1989 | Igusa et al. ......................... 99/286 X |
| 5,169,231 | * | 12/1992 | Suzuki ............................... 99/348 X |
| 5,182,981 | * | 2/1993 | Wilcox ............................... 99/348 X |
| 5,193,444 | * | 3/1993 | Bar-Sheshet ....................... 99/348 X |
| 5,454,298 | * | 10/1995 | Lu ....................................... 99/348 X |
| 5,638,607 | * | 6/1997 | Lemmen et al. ................. 99/323.4 X |
| 6,123,971 | * | 9/2000 | Tidland ................................ 426/466 |

FOREIGN PATENT DOCUMENTS

92/12643 * 8/1992 (WO) .................................. 426/466

* cited by examiner

Primary Examiner—Milton Cano
(74) Attorney, Agent, or Firm—Marger Johnson & McCollom, P.C.

(57) ABSTRACT

A roasting device is designed to fit and operate inside a conventional, general purpose, home oven. The roasting device utilizes the heating and exhaust system already in place for the oven allowing the roasting device to be substantially less complex and less expensive than existing coffee roasting systems. The roasting device includes roasting chamber or drum for containing the coffee beans. The roasting chamber has a first and a second end and a substantially cylindrical sidewall. The substantially cylindrical sidewall includes a plurality of perforations uniformly distributed along its length. The perforations allow the heat from a conventional home oven to reach the circulating coffee beans during roasting thereby producing evenly roasted coffee beans. The coffee beans discard chaff during roasting that is expelled through the perforations to a tray positioned underneath the roasting chamber. The first and second ends are substantially concave for preventing the coffee beans from adhering to the ends. The second end includes a lid for loading and unloading the coffee beans into the roasting chamber. The roasting device includes a body or housing that encloses a rotating mechanism. The rotating mechanism includes a shaft for rotating the roasting chamber during roasting, the shaft being adapted to receive the chamber and a drive drum. The drive drum has a spring for winding the spring responsive to a wind up key. A take up drum is coupled to the drive drum for taking up the spring during roasting. A plurality of gears is coupled to both the drive and take up drums for transferring rotation of the drive and take up drums to the drum. An escapement assembly is coupled to the plurality of gears for controlling the rotation of the roasting chamber. The roasting system is preferably made of stainless steel.

21 Claims, 7 Drawing Sheets

HOME USE COFFEE BEAN ROASTING DEVICE AND METHOD OF ROASTING

This application is continuation of U.S. application Ser. No. 09/264,368, filed Mar. 8, 1999, now U.S. Pat. No. 6,123,971.

BACKGROUND OF THE INVENTION

1. Field of the Invention

This invention relates to a roasting device and, more particularly, to a coffee bean roasting device for roasting small quantities of coffee beans in the convenience of a person's home.

2. Description of the Prior Art

Coffee beans develop color, taste, and smell during roasting. Roasting processes must produce consistent bean roasts for a wide variety of desired bean flavors. If the beans are not circulated evenly inside the roasting chamber, coffee beans will not roast evenly. Thus, even a skilled roast master has difficulty reproducing consistent coffee roasts from time to time.

There are two primary methods for roasting coffee beans. The first method is drum roasting. Drum roasting involves a technique similar to clothes drying. Unroasted or green coffee beans are placed in a round drum. Heating elements adjacent to the drum heat both the drum and the air inside of the drum. The heat from the inside wall of the drum is transferred to the coffee beans. As the coffee beans roll inside the drum, the coffee beans are heated and scorched, changing from a green state to a roasted condition. To generate darker roasts, the coffee beans are heated in the drum at a higher temperature or at the same temperature but for a longer time. U.S. Pat. No. 4,860,461 to Tamaki, et al., shows a drum roaster. In Tamaki, stirring and exposing the beans to radiant heat from infrared heaters adjacent to the drum roasts the beans in the drum.

The second method involves a fluid bed roaster that blows air up from the bottom end of a roasting chamber. The air raises the green coffee beans up on a bed of hot air causing the beans to circulate inside the chamber. U.S. Pat. No. 3,964,175 to Sivetz shows such a fluid bed coffee roasting system. In Sivetz, air is heated to a selected temperature that roasts tie beans primarily by convection. The coffee beans are secondarily roasted by the conduction of heat from bean to bean and from the inside walls of the roasting chamber to the coffee beans.

Coffee bean roasting systems, such as those described in Tamaki and Sivetz, are very large complex machines. Thus, current roasting systems are usually operated in industrial locations. While large roasting machines may be suitable for the coffee roasting industry or for retail coffee shops that require roasting high volumes of coffee beans daily, they are ill-suited for home use that require smaller quantities of coffee beans. Moreover, few coffee lovers would tolerate a machine the size of a refrigerator taking up valuable kitchen space no matter how much they enjoy roasting their own coffee.

Existing roasting machines are also difficult to operate and expensive to maintain. Additionally, large roasting machines require custom equipment and include complex exhaust systems. Thus, coffee roasting systems are not feasible for ordinary home use. Finally, large coffee roasting machines are expensive.

Accordingly, a need remains for a home use coffee roasting device that evenly roasts a small quantity of coffee beans. A need also remains for a home use coffee roasting device that is simple, small, inexpensive, and easy to operate and maintain.

SUMMARY OF THE INVENTION

A roasting device is designed to fit and operate inside a conventional, general purpose, home oven. The roasting device utilizes the heating and exhaust system already in place for the oven. This allows the roasting device to be substantially less complex and less expensive than existing coffee roasting systems.

The roasting device includes a roasting chamber or drum for containing the coffee beans or other like foods to be roasted. The roasting chamber has a first and a second end and a substantially cylindrical sidewall. The substantially cylindrical sidewall includes a plurality of perforations uniformly distributed along its length. The perforations allow the heat from the conventional home oven to reach the coffee beans in the rotating chamber during roasting thereby producing evenly roasted coffee beans. The coffee beans discard chaff during roasting that is expelled through the perforations to a tray positioned underneath the roasting chamber. The tray is fixedly attached to the body. The plurality of perforations is sized according to a size of the coffee beans being roasted. The first and second ends are substantially concave for preventing the coffee beans from adhering to the ends. The second end includes a lid for loading and unloading the coffee beans into the roasting chamber.

The roasting system includes a body or housing that encloses a rotating mechanism. The rotating mechanism includes a shaft for rotating the roasting chamber during roasting, the shaft being adapted to receive the chamber. The body includes a key mounted to the body for engaging the rotating mechanism and an on/off lever for turning the rotating mechanism on when the lever is in a first position and off when the lever is in a second position. The rotating mechanism includes a drive drum having a spring for winding the spring responsive to a wind up key and a take up drum coupled to the drive drum for taking up the spring during roasting. A plurality of gears is coupled to the drive and take up drums for transferring rotation of the drive and take up drums to the drum. The rotating mechanism includes an escapement assembly coupled to the plurality of gears for controlling the rotation of the roasting chamber. The roasting system includes a handle for manipulating the roasting system in and out of a conventional home oven. Importantly, the entire roasting system is sized to fit within the conventional home oven and is preferably made of stainless steel.

A method for roasting coffee beans or other like foods comprises loading coffee beans into a roasting chamber or drum of a coffee bean roaster, rotating the roasting chamber with a rotating mechanism coupled to the chamber, and placing the rotating coffee bean roaster in a preheated conventional home oven until the coffee beans reach the desired roasted consistency. Rotating the roasting chamber includes winding up the rotating mechanism of the coffee bean roaster and turning on the rotating mechanism. The rotating mechanism releases stored energy that it gears down with the plurality of gears. The geared down energy is then transferred to the roasting chamber via a shaft adapted to receive the chamber. The method also includes positioning a tray underneath the roasting chamber for catching chaff discarded by the coffee beans during roasting and carrying the roaster to the oven using a handle attached to the roaster. A cooling tray is used for cooling down the beans faster after roasting.

BRIEF DESCRIPTION OF THE DRAWINGS

The foregoing and other objects, features, and advantages of the invention will become more readily apparent from the following detailed description of a preferred embodiment that proceeds with reference to the following drawings.

DETAILED DESCRIPTION OF THE PREFERRED EMBODIMENT

The invention is described with respect to roasting coffee beans. However, a person having skill in the art should recognize that the coffee roasting device of the present invention can be used to roast other like foods, such as nuts and seeds, e.g., hazelnuts, chestnuts, peanuts, walnuts, almonds, pumpkin seeds, and the like.

Figure 1:
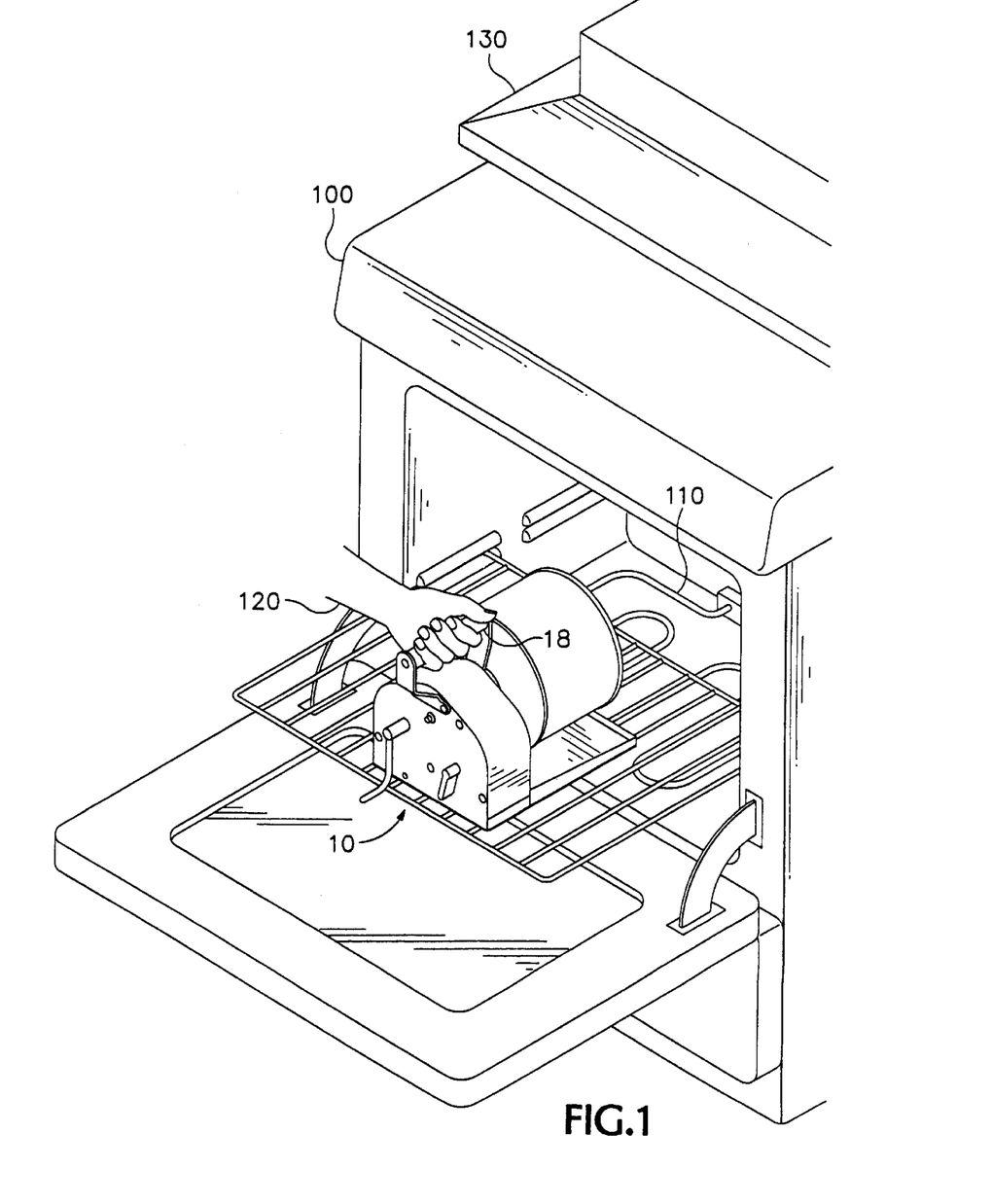
FIG. 1 is a perspective side view of the coffee roasting device of the present invention shown inside of a conventional home oven.

Referring to FIG. 1, the roasting device 10 of the present invention is designed to fit and operate inside a conventional home oven 100. The roasting device utilizes the heating mechanism 110 and exhaust system 130 already in place for the oven 100 allowing the roasting device 10 to be substantially less complex and less expensive than existing coffee roasting systems. The portable size of the roasting device 10 makes it possible for a user 120 to easily place the roasting device 10 inside the conventional oven 100 using handle 18.

Figure 2:
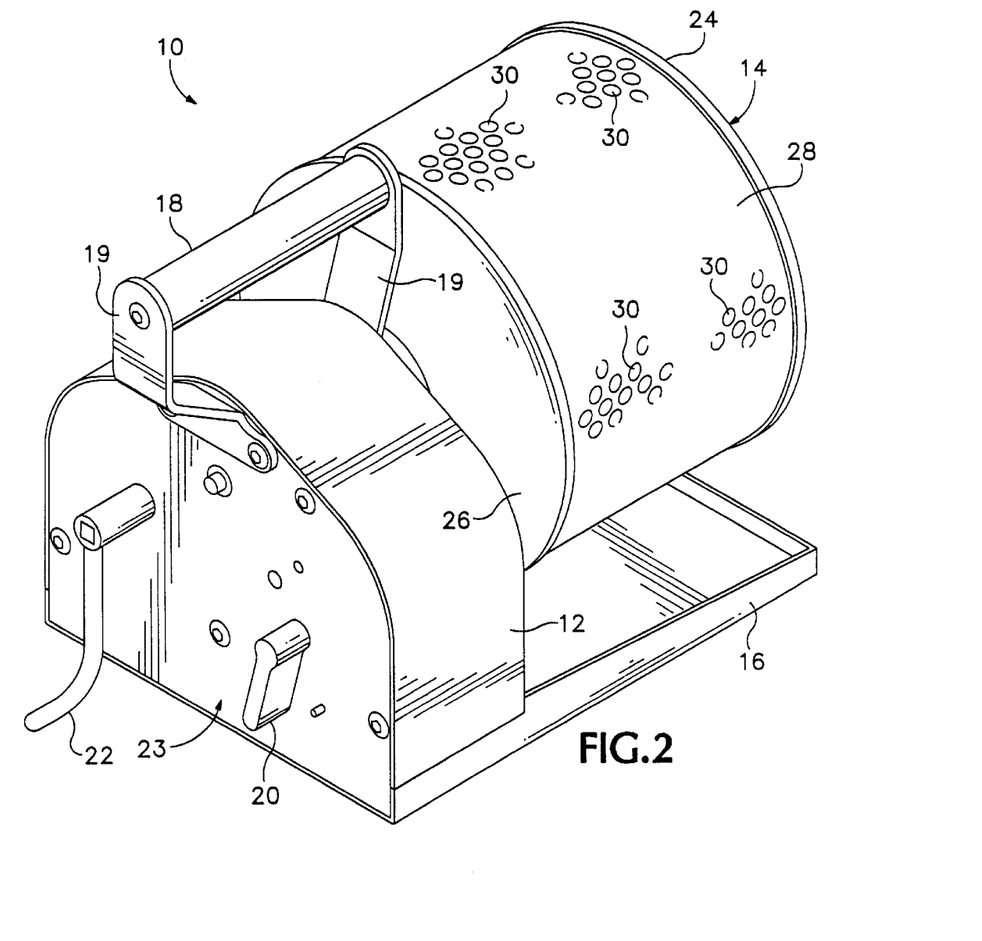
FIG. 2 is a perspective top view of the coffee roasting device of the present invention.
Figure 3:
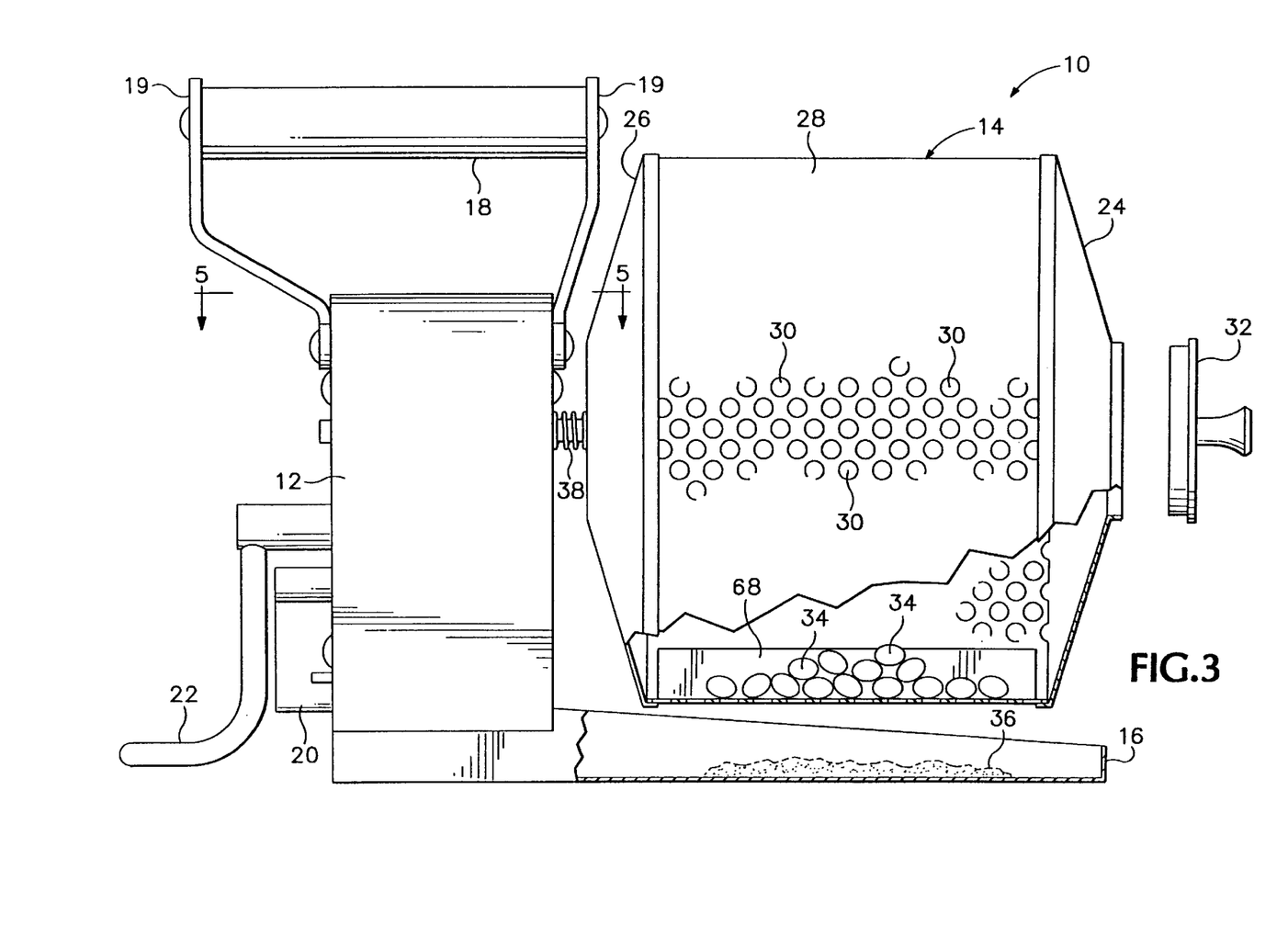
FIG. 3 is a side view of the coffee roasting device shown in FIG. 1.

Referring to FIGS. 2 and 3, the coffee roasting device 10 of the present invention includes a body or housing 12 for supporting a roasting chamber or drum 14. The roasting chamber 14 includes a first end 24 and a second end 26. The first end 24 includes a removable lid 32 (FIG. 3) for loading and unloading coffee beans 34 into the drum 14 before and after roasting. As best shown in FIG. 3, the first and second ends 24 and 26, respectively, have a substantially concave shape for preventing the coffee beans 34 from adhering to the ends during rotation of the drum 14.

A substantially cylindrical sidewall 28 surrounds the roasting chamber 14. The sidewall 28 includes a plurality of perforations (holes) 30 uniformly distributed along its length. The perforations 30 are generally sized smaller than the beans 34 thereby preventing the beans 34 from falling out through the perforations 30 during rotation of the drum 14. The perforations 30 allow heat from the conventional home oven 100 (FIG. 1) to reach the coffee beans 34 during roasting.

A rotating shaft 38 is mounted to the body or housing 12 and adapted to receive the roasting chamber 14. The rotating shaft 38 is controlled by a rotating mechanism 23 (FIGS. 5 and 6) that rotates the chamber or drum 14 thereby circulating the coffee beans 34 inside of the drum 14 during roasting.

A tray 16 is attached to the body 12 and positioned underneath the chamber 14. During roasting, chaff 36 (FIG. 3) is discarded by the coffee beans 34 as they circulate in the roasting chamber 14. The perforations 30 are generally sized larger than the chaff 36 to allow the chaff 36 to be expelled through the perforations 30 and collected by the tray 16.

A handle 18 is mounted to the body or housing 12 via two brackets 19 for carrying the coffee roasting device 10. The coffee roasting device 10 should be removed from the oven 100 using a conventional oven mitt (not shown) to avoid burning the hand(s) of the user 120.

Figure 4:
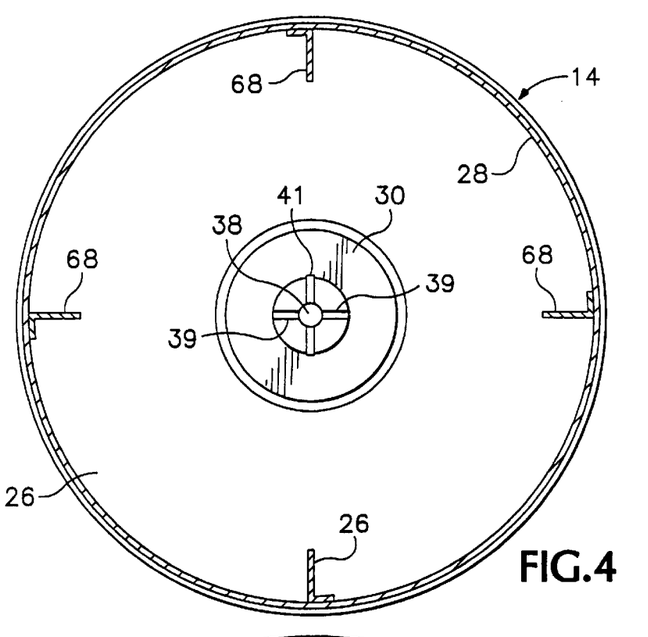
FIG. 4 is a front section view of the roasting device shown in FIG. 1.
Figure 5:
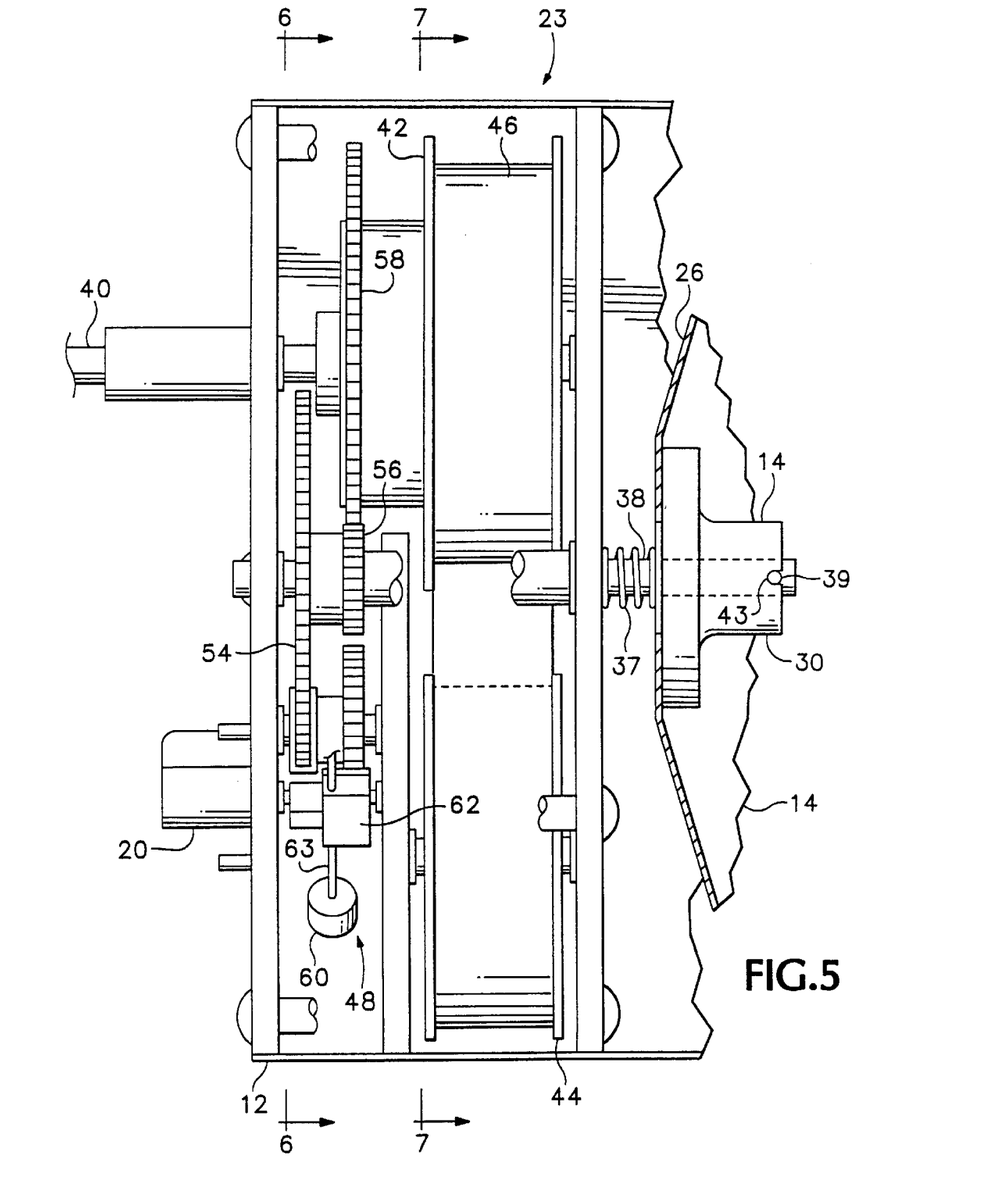
FIG. 5 is a detailed top view of the rotating mechanism for the coffee roasting device shown in FIG. 1.

Referring to FIGS. 4 and 5, a plurality of baffles 68 are attached to the cylindrical side wall 28. The plurality of baffles 68 ensure a uniform bean roast by continuously flipping the beans as the roasting chamber 14 rotates. In the preferred embodiment, four baffles 68 are spaced at 90 degrees from an adjacent baffle 68.

The chamber 14 can be either fixed or removably attached to the shaft 38. In the preferred embodiment, the roasting chamber 14 is removably attached to the shaft 38 for ease of cleaning. The roasting chamber 14 is attached by inserting the shaft 38 and arms 39 through a slot 41 in the end of chamber 14 and compressing spring 37. The chamber 14 is rotated 90°, aligning the arms 39 with recess 43. The chamber 14 is released and the spring 37 pushes the chamber 14 outward seating the arms 39 in recess 43. The roasting chamber 14 is removed by pushing the chamber 14 toward shaft 38 compressing spring 37. The chamber 14 is rotated 90° and then the arms 39 slid out through slot 41.

Figure 6:
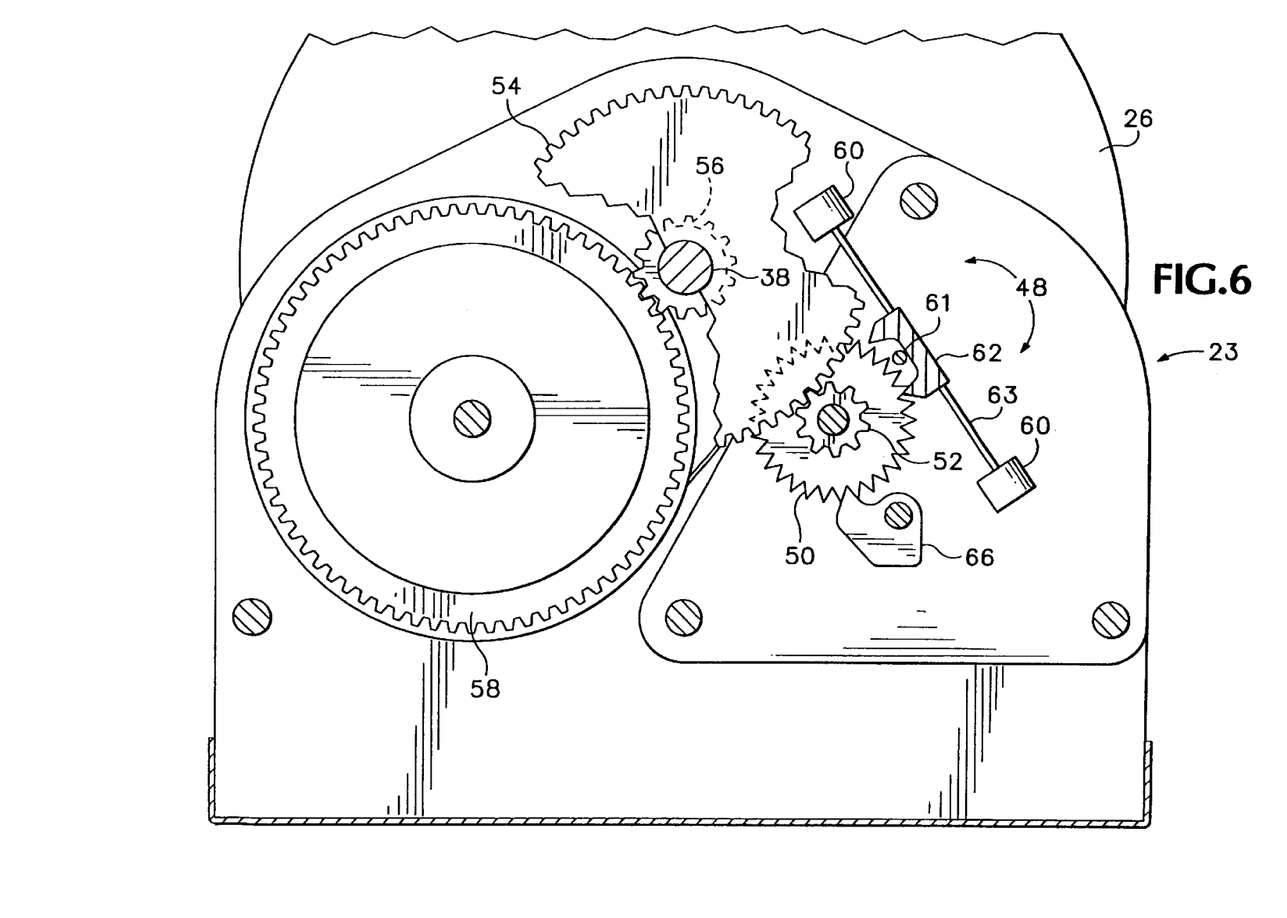
FIG. 6 is a broken away section view of the rotating mechanism shown in FIG. 3.

The body or housing 12 encloses the rotating mechanism 23 for rotating the shaft 38 and, thus, the roasting chamber 14. Referring to FIGS. 5 and 6, the rotating mechanism 23 includes an escapement assembly 48 mounted to the body 12 via pin 61. The escapement assembly 48 includes a pair of counterweights 60 mounted at each end of a shaft 63. The shaft 63 traverses the length of escapement pawl 62. The pendulum motion of the counterweights 60 move the pawl 62 up and down the teeth of escapement gear 50. Escapement gear 50, in turn, controls the speed of rotation of the gears 52, 54, and 56 and thus, of the shaft 38 that rotates the roasting chamber 14. In this manner, the escapement assembly 48 controls the speed of rotation of chamber 14. In the preferred embodiment, the coffee roasting device 10 rotates at a speed between 5 and 7 revolutions per minute. The operation of escapement assemblies, such as escapement assembly 48, is well known and will not be described in further detail.

Figure 7:
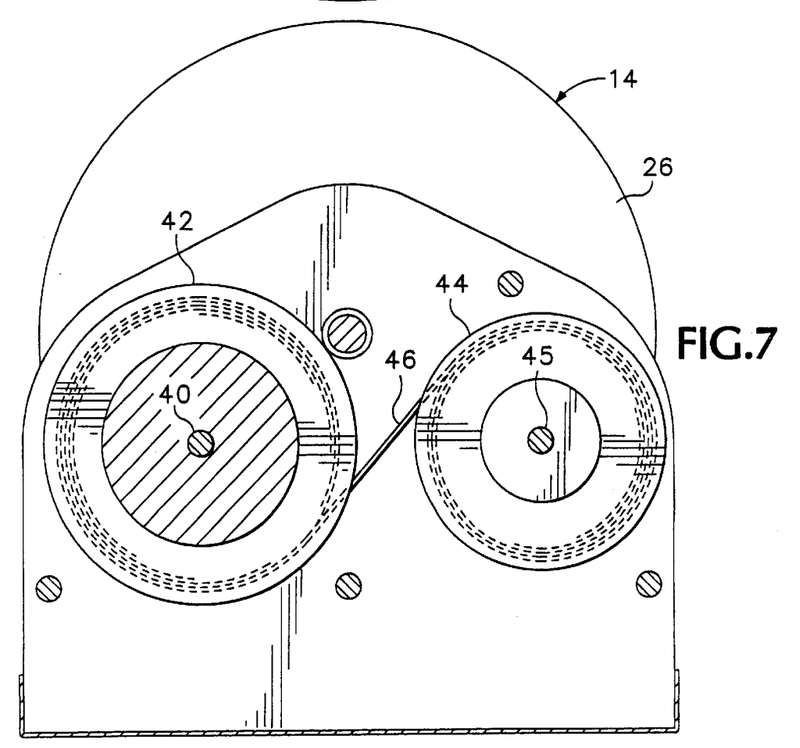
FIG. 7 is a section side view of the drive drum assembly for the coffee roasting device shown in FIG. 1.

Referring specifically to FIGS. 2–3 and 7, a drive drum 42 and a wind up key 22 are mounted to a rotating shaft 40 attached to the body 12. Similarly, a take up drum 44 is mounted to a rotating shaft 45 attached to the body 12. A spring 46 is anchored at a first end to the drive drum 42 and at a second end to the take up drum 44. An lever 20 includes an on and an off position for controlling an on/off pawl 66 (FIG. 6). When the lever 20 is in the on position, the on/off pawl 66 releases the escapement gear 50 allowing rotation of the roasting chamber 14.

The coffee roasting device 10 operates in the following manner. A user desiring to roast coffee beans first introduces the unroasted or green beans 34 into the drum 14 by removing the lid 32 (FIG. 3). In the preferred embodiment, the drum 14 is sized to receive a relatively small amount of beans, e.g., a half-pound or a pound. After replacing the lid 32, the user turns the wind up key 22 in a predetermined direction rotating the shaft 40. Rotation of the shaft 40 turns the drive drum 42 in the same direction as the shaft 40. The rotation of the drive drum 42 winds the spring 46 around the drum 42. The amount of winding and, ultimately, the length of the spring 46, should roughly correspond to how long the user wants to roast the coffee beans 34. If the user desires only a short roasting time, then a shorter number of windup routines are necessary. Conversely, if the user desires a long roasting time, then the entire length of the spring 46 may be wound around the drive drum 42. After winding the spring 46, the user moves the on/off lever 20 from the off to the on position disengaging the on/off pawl 66 from the teeth of the escapement gear 50 (FIG. 6).

When the on/off pawl 66 is disengaged, the energy of the spring 46 is released allowing the drive and take up drums 42 and 44, respectively, and gears 50, 52, 54, 56, and 58 to rotate which, in turn, rotate the roasting chamber 14. As the drive drum rotates, the take up drum 44 winds the spring 46 as it unwinds from the drive drum 42. The up and down movement of the counterweights 60 along the teeth of the escapement gear 50 control the speed at which the gears 50, 52, 54, 56, and 58, the shaft 38, and the chamber 14 rotate under the energy of the spring 46. The rotation of the roasting chamber 14 causes the baffles 68 to flip the beans 34. The flipping motion of the baffles 68 encourages an even roast of the beans 34.

Once the roasting chamber 14 on the coffee roasting device 10 is rotating, the user 120 introduces the coffee roasting device 10 by the handle 18 into the preheated conventional home oven 100 (FIG. 1). The heat of the oven 100 or, in a convection oven, the hot air circulating inside of the oven 100, together with bean to bean heat, roasts the coffee beans 34 through perforations 30 as they rotate inside of the chamber 14. As the coffee beans 34 roast inside of the oven 100, the beans discard chaff 36. The chaff filters through the perforations 30 and is collected by the tray 16 (FIG. 3).

The roasting times and temperatures vary with the type of coffee beans 34 and with the roasting consistency desired. For an average roast, the oven temperatures vary between 425 to 475 degrees and the average roasting times vary between 30 and 45 minutes. Once the beans are roasted to the desired consistency, the user 120 removes the still rotating coffee roasting device 10 from the oven 100 by the handle 18. The roaster of the present invention is made of a material capable of withstanding the temperatures necessary to roast beans without incurring damage, such as, stainless steel and other like metals.

Figure 8:
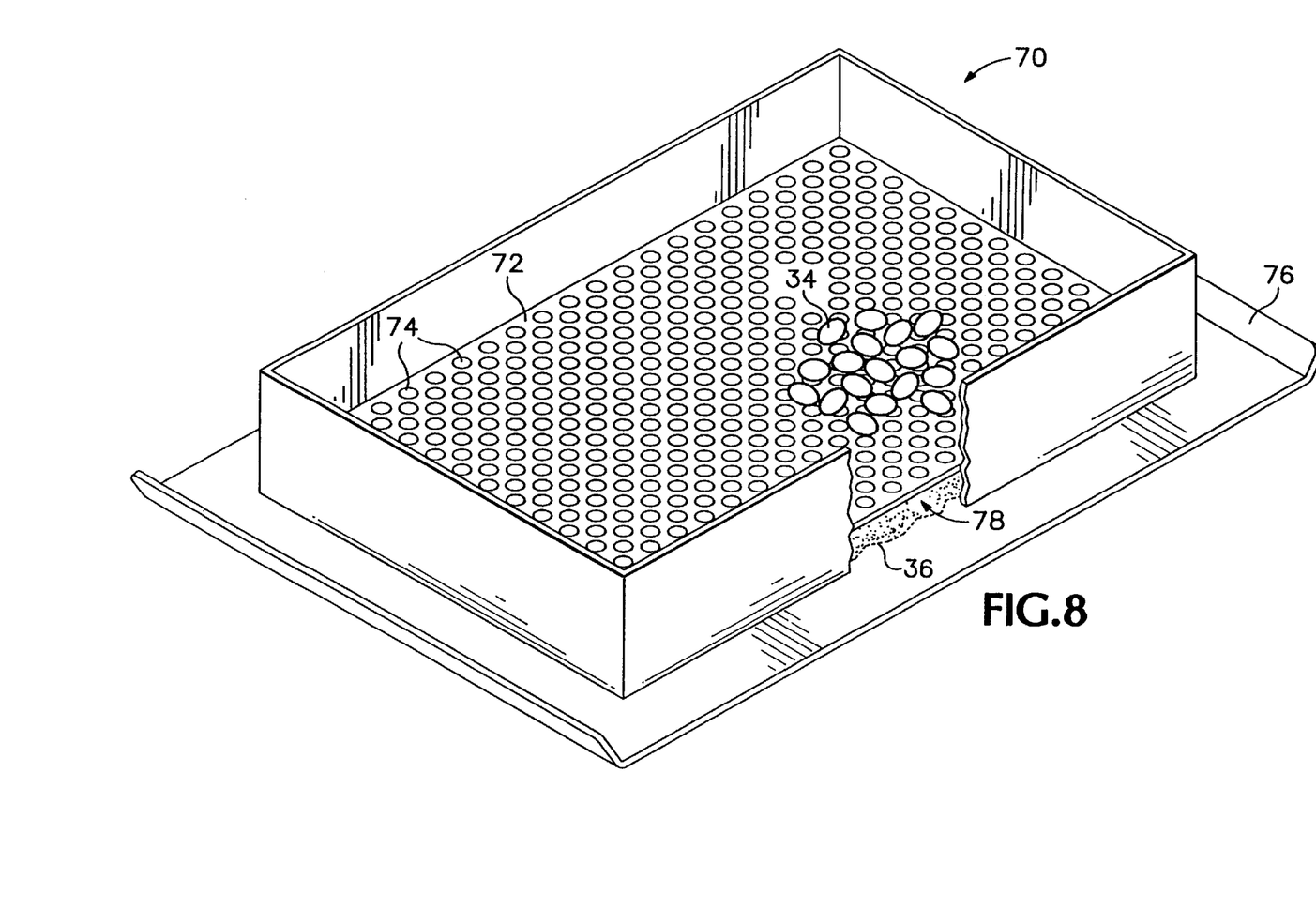
FIG. 8 is a perspective view of a cooling tray used with the coffee roasting device.

FIG. 8 is a perspective view of a dual level cooling tray 70. A top tray 72 includes perforations 74. The top tray 72 sits on a cookie sheet. Coffee beans 34 are spread on top tray 72 after completing the roasting process in device 10. Air circulates through the perforations 74 and through the space 78 between the top tray 72 and cookie sheet 76. Any additional chaff 34 also passes through perforations 74 onto cookie sheet 76. The improved air flow in the dual level tray 70 allows more rapid cooling of the roasted coffee beans 34 providing better control of the roasting process.

Since the amount of beans roasted at one time is relatively small, the roasting process does not produce the vast quantities of smoke and other pollutants that are generated in industrial roasters. Thus, the conventional home oven ventilation system 130 (FIG. 1) can be used. Moreover, because of its relatively small size, the roaster 10 of the present invention takes advantage of an existing home cooking appliance, i.e., an oven, to roast coffee beans, obviating the need for a large, complex, special-purpose machine. The roasting device of tie present invention is also less expensive and easier to operate and maintain than stand alone coffee roasting machines.

Having illustrated and described the principles of my invention in a preferred embodiment thereof, it should be readily apparent to those skilled in the art that the invention can be modified in arrangement and detail without departing from such principles. I claim, all modifications coming within the spirit and scope of the accompanying claims.

What is claimed is:

1. A roasting device, comprising:
   a housing including:
      a roasting chamber;
      a mechanism for circulating a food product in the roasting chamber;
      the roasting device sized to fit within a home oven; and
      the roasting chamber is configured to allow roasting of the food product in the roasting chamber by a heating system in the oven.

2. The roasting device according to claim 1 wherein the rotating mechanism includes a spring for mechanically rotating the roasting chamber.

3. The roasting device according to claim 1 wherein the housing includes an lever for activating the rotating mechanism when the lever is in a first position and deactivating the rotating mechanism when the lever is in a second position.

4. The roasting device according to claim 1 including a tray attached to the housing and arranged for collecting chaff from the food product discarded through perforations in the roasting chamber during roasting.

5. The roasting device according to claim 4 wherein the roasting chamber includes a plurality of baffles attached to a cylindrical side wall for continuously flipping the food product.

6. The roasting device according to claim 1 wherein the roasting chamber includes a lid for loading and unloading the food product to the roasting chamber.

7. A roasting device according to claim 1 wherein the rotating mechanism includes:
   a drive drum for receiving a spring responsive to a wind up key;
   a take up drum coupled to the drive drum for taking up the spring unwound from the drive drum during roasting; and
   a plurality of gears coupled to the drive and take up drums for transferring rotation of the drive and take up drums to the roasting chamber.

8. The roasting device according to claim 7 wherein the rotating mechanism includes an escapement assembly coupled to the plurality of gears for controlling the rotation of the roasting chamber.

9. The roasting device according to claim 1 including a heat resistant handle mounted to the housing for hand lifting the roasting device.

10. The roasting device according to claim 1 wherein the rotating mechanism includes a shaft adapted to detachably connect with the roasting chamber.

11. A coffee bean roaster, comprising:
   a roasting chamber drum for roasting coffee beans;
   a drive system including a rotating shaft for receiving the roasting chamber drum and rotate the roasting chamber drum during roasting; and
   a spring that is hand windable for mechanically rotating the roasting chamber;
   wherein the coffee bean roaster is sized to fit within a conventional home oven and the roasting chamber rotates while the oven roasts the coffee beans.

12. The coffee bean roaster according to claim 11 wherein the drum is exposed to inside walls of the oven.

13. The coffee bean roaster according to claim 11 wherein the drive system includes an escapement assembly for controlling the rotation of the drum.

14. The coffee bean roaster according to claim 11 wherein the drum includes a plurality of baffles attached to cylindrical sidewalls for flipping the coffee beans.

15. The coffee bean roaster according to claim 11 including a cooling tray having an upper tray with perforations that hold the coffee beans above a lower tray.

16. A method for roasting a food product, comprising:

loading the food product into a roasting chamber;

placing the roasting chamber into an oven;

mechanically rotating the roasting chamber using a rotating mechanism coupled to the roasting chamber; and roasting the food product using the oven while the food product is rotating in the rotating chamber.

17. The method of claim 16 including winding up a spring in the rotating mechanism and using the spring to rotate the roasting chamber.

18. The method of claim 16 including:

storing energy in a pair of drums;

releasing the stored energy as rotational energy;

gearing down the rotational energy of the drums with a plurality of gears; and transferring the geared down energy to the roasting chamber via a shaft in the rotating mechanism for receiving the roasting chamber.

19. The method of claim 16 including positioning a tray underneath the roasting chamber for catching chaff discarded by the food product during roasting.

20. The method of claim 16 including attaching a heat resistant handle to the roasting chamber to hand carry the roasting chamber.

21. The method according to claim 16 including spreading the roasted coffee beans on top of a cooling tray having a side and top surface including perforations that allow air to circulate above and below the roasted coffee beans.

* * * * *